United States Patent
Tanner (10) Patent No.: US 8,796,168 B2
(45) Date of Patent: Aug. 5, 2014

(54) MODIFIED SYNTHETIC XENOTIME MATERIAL, ARTICLE COMPRISING SAME AND METHOD FOR MAKING THE ARTICLES

(75) Inventor: Cameron Wayne Tanner, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 1679 days.

(21) Appl. No.: 12/072,630

(22) Filed: Feb. 27, 2008

(65) Prior Publication Data

US 2009/0211299 A1 Aug. 27, 2009

(51) Int. Cl.
*C04B 35/50* (2006.01)
*C03B 11/08* (2006.01)

(52) U.S. Cl.
CPC .................... *C04B 35/50* (2013.01); *C03B 11/08* (2013.01)
USPC ............................. 501/152; 65/144

(58) Field of Classification Search
CPC ............... C04B 35/50; C03B 11/08
USPC ............................. 65/374.1; 501/45
See application file for complete search history.

(56) References Cited

U.S. PATENT DOCUMENTS

| 4,033,790 A | 7/1977 | Gunjigake et al. ............... 35/40 |
| 5,350,460 A | 9/1994 | Pckrell et al. ................... 21/225 |
| 6,974,786 B2 | 12/2005 | Helfinstine et al. ............... 17/6 |
| 7,001,679 B2 | 2/2006 | Campbell et al. | |
| 2003/0121287 A1 | 7/2003 | Chalk et al. ................... 17/6 |

FOREIGN PATENT DOCUMENTS

WO  WO2006/073841  7/2006  ............. C03B 11/08

OTHER PUBLICATIONS

S. Erdei, et al., *Hydrolyzed colloid reaction (HCR) technique for preparation of $YVO_4$, $YPO_4$ and $YV_xP_{1-x}O_4$* *. Elsevier Science B.V., Materials Letters 21 (1994) 143-147.
D. Bregiroux, et al. Sintering and microstruture of rare earth phosphate ceramics $REPO_4$ with RE=La Ce or Y, *Journal of the European Ceramic Society* 26 (2006) 279-287.
M. Ramzi, et al., *Optical and crystal-field analysis of $Er^{3+}$ion in $Y_2O_3$-$P_2O_5$ thin films*, Journal of Luminescence 126 (2007) 165-170.
S. Lucas, et al. *Synthesis and Characterization of Rare Earth Phosphate Powders*, Key Engineering Materials vols. 206-213 (2002), pp. 47-50.

*Primary Examiner* — Jodi C Franklin
(74) *Attorney, Agent, or Firm* — Stephen Wentsler; Thomas R. Beall (57) ABSTRACT

Synthetic sintered $YPO_4$ composite materials comprising excess amount of $Y_2O_3$ in the composition and process for making such materials. The $Y_2O_3$-modified sintered $YPO_4$ composite material exhibits improved mechanical properties compared to stoichiometric $YPO_4$ materials. The modified $YPO_4$ materials can be used to produce different components used in the glass-making process such as, for example, an isopipe.

12 Claims, 8 Drawing Sheets

MODIFIED SYNTHETIC XENOTIME MATERIAL, ARTICLE COMPRISING SAME AND METHOD FOR MAKING THE ARTICLES

TECHNICAL FIELD

The present invention relates to synthetic $YPO_4$ material, method for making such material and article comprising such material. In particular, the present invention relates to compositionally and structurally modified $YPO_4$ material comprising yttria, article comprising such material for high-temperature applications and method for making such article. The present invention is useful, e.g., for making isopipe for fusion draw glass making processes.

BACKGROUND

Liquid crystal displays (LCDs) offer superior picture quality, have a smaller footprint, are more energy efficient than CRTs, and can be manufactured economically. For this reason, the market for LCDs is expanding rapidly. In terms of new products, there has been an on-going trend to introduce displays with larger active areas to compete more effectively with other display technologies. Additionally, a process that can produce larger displays can also be used to manufacture many smaller displays in parallel and thereby leverage economies of scale to reduce overall production costs.

One approach to manufacturing LCD glass sheets involves the fusion process. A key component of the fusion process is the isopipe. There is currently a demand for the production of wider LCD glass sheets. The maximum sheet glass width that can be produced by a fusion draw machine (FDM) is limited by the length of the isopipe. Thus, longer isopipes are needed to produce wider glass sheets.

Certain isopipes currently used to produce LCD glass sheets are made from a zircon refractory. High temperature creep of the isopipe is believed to limit its operational lifetime. Display glass drawn on an isopipe with excessive creep cannot produce a sheet of uniform thickness. Creep deformation leads to an uneven distribution of glass flow. Hence, a reduction in the intrinsic creep rate of the refractory material used to manufacture the isopipe can result in the use of a wider isopipe, extend the fusion draw process to higher temperature glasses, and extend service life of the isopipe in the current process to minimize process down time and replacement costs.

In the case of an isopipe, the creep rate is a function of the material itself as well as the length and height of the isopipe. Longer isopipes are more prone to failure due to creep. Failure of the isopipe can interrupt the production of glass and lead to prolonged, undesired downtime of the manufacture process.

The creep rate of a polycrystalline ceramic body such as an isopipe is influenced by factors that can be categorized as either microstructural (e.g., porosity, grain size, grain shape, and arrangement of second phases) or chemical such as stoichiometry and concentration of impurities. The microstructure and chemical composition of the ceramic body are themselves dependent upon processing history, which includes initial particle size of the powders, sintering temperature, and contaminants. These same factors play a role in the ability of the material to meet other requirements for an isopipe such as strength. Thus, it would be desirable to modify the microstructural properties and chemical composition of a refractory material such that the creep rate is reduced and other properties remain satisfactory. Ultimately, the refractory material would be used to produce isopipes and other components used in the glass-making process. The methods and compositions described herein address this need.

SUMMARY

Accordingly, a first aspect of the present invention relates to a sintered $YPO_4$ composite material comprising a plurality of grains, having a composition comprising $(Y_2O_3)m \cdot (P_2O_5)n$, and a deficient amount of $De(P)$ of $P_2O_5$ relative to $Y_2O_3$, where m and n are mole fractions of $Y_2O_3$ and $P_2O_5$ in the composite material, respectively, $De(P)=((m-n)/n) \times 100\%$, and $0<De(P) \leq 0.5\%$. In certain embodiments, $De(P) \geq 0.10\%$; in certain other embodiments $De(P) \geq 0.15\%$.

In certain embodiments of the first aspect of the present invention, the sintered $YPO_4$ composite material comprises at least 95% (in certain embodiments at least 96%, in certain embodiments at least 97%, in certain embodiments at least 98%, in certain embodiments as least 99%, in certain embodiments at least 99.5%) by mole of $(Y_2O_3)m \cdot (P_2O_5)n$.

In certain embodiments of the first aspect of the present invention, the sintered $YPO_4$ composite material has a geometric porosity of less than 10%; in certain embodiments less than 9%; in certain other embodiments less than 8%; in certain other embodiments less than 7%, in certain other embodiments less than 5%. In certain embodiments, at least 90% (in certain embodiments at least 95%, in certain embodiments at least 98%) of the pores in the sintered $YPO_4$ material are closed.

In certain embodiments of the first aspect of the present invention, the sintered $YPO_4$ composite material has an average grain size of less than 300 μm, in certain embodiments less than 100 μm, in certain other embodiments less than 40 μm. In certain embodiments, the sintered $YPO_4$ material has an average grain size of at least 10 μm.

In certain embodiments of the first aspect of the present invention, the sintered $YPO_4$ composite material has a creep rate of less than 200 ppb/hr at 1180° C. In certain embodiments, the sintered composite material has a creep rate of less than 600 ppb/hr at 1250° C.

In certain embodiments of the first aspect of the present invention, the sintered $YPO_4$ composite material has a Weibull stress of at least 60 MPa at 1200° C., in certain embodiments at least 100 MPa, in certain other embodiments at least 120 Mpa.

A second aspect of the present invention relates to an article operable at a temperature at higher than 1000° C., comprising the sintered $YPO_4$ composite material according to the first aspect of the present invention described summarily above and in detail below. In certain embodiments of the second aspect of the present invention, the article is an isopipe for fusion draw process for making a glass article.

A third aspect of the present invention is an apparatus for making glass comprising the article according to the second aspect of the present invention.

A fourth aspect of the present invention is a method for making an article comprising a sintered $YPO_4$ composite material, comprising the following steps: (I) mixing a $P_2O_5$-source material and a $Y_2O_3$-source material to produce an admixture comprising more $Y_2O_3$-source material than required for forming stoichiometric $YPO_4$; (II) heating the admixture to obtain a reacted material; (III) producing particles of the reacted material; (IV) forming the particles into a preform; and (V) sintering the preform to obtain an article comprising sintered $YPO_4$ composite material comprising a plurality of grains, having a composition comprising $(Y_2O_3)m \cdot (P_2O_5)n$, and an excessive amount of $De(P)$ of $P_2O_5$ relative to $Y_2O_3$, where m and n are mole fractions of $Y_2O_3$ and $P_2O_5$ in the composite material, respectively, $De(P)=((m-n)/n)\times 100\%$, and $0<De(P)\leq 0.5\%$.

In certain embodiments of the fourth aspect of the preset invention, in step (I), the $P_2O_5$-source material comprises $P_2O_5$; and the $Y_2O_3$-source material comprises $Y_2O_3$.

In certain embodiments of the fourth aspect of the present invention, in step (III), the particles formed have an average particle size from 0.1 to 100 μm; in certain embodiments from 0.1 to 45 μm; in certain other embodiments from 0.1 to 30 μm; in certain other embodiments from 0.1 to 15 μm.

In certain embodiments of the fourth aspect of the present invention, step (IV) comprises isopressing the particles.

In certain embodiments of the fourth aspect of the present invention, step (V) comprises a step of heating the preform in the temperature range from 1000° C. to 1475° C. for a period of at least 3 hours.

In certain embodiments of the fourth aspect of the present invention, step (V) comprises a step of heating the preform in the temperature range from 1600° C. to 1775° C. for a period from 24 hours to 1,000 hours.

In certain embodiments of the fourth aspect of the present invention, in step (I), the amounts of $P_2O_5$-source materials and $Y_2O_3$-source materials are chosen such that in step (V), in the resultant sintered $YPO_4$ composite material, $0.10\% \leq De(P) \leq 0.50\%$, in certain embodiments $0.15\% \leq De(P) \leq 0.50\%$.

In certain embodiments of the fourth aspect of the present invention, in step (V), the sintered $YPO_4$ composite material has a geometric porosity of less than 10%; in certain embodiments less than 9%; in certain other embodiments less than 8%; in certain other embodiments less than 7%. In certain embodiments, in step (V), the pores in the sintered $YPO_4$ composite material are essentially closed (at least 90% by number, in certain embodiments at least 95%, in certain other embodiments at least 98%, in certain embodiments at least 99%).

In certain embodiments of the fourth aspect of the present invention, in step (V), the resultant sintered $YPO_4$ composite material has an average grain size of less than 300 μm, in certain embodiments less than 100 μm, in certain other embodiments less than 40 μm.

In certain embodiments of the fourth aspect of the present invention, in step (V), the resultant sintered $YPO_4$ composite material has an average grain size of at least 10 μm. In certain embodiments, in step (V), the resultant sintered $YPO_4$ composite material has a creep rate of less than 200 ppb/hr at 1180° C. In certain embodiments, in step (V), the resultant sintered composite material has a creep rate of less than 600 ppb/hr at 1250° C.

Certain embodiments of one of the present invention has one or more of the following advantages: The material and the isopipe can have higher strength and lower creep rate even at a high operating temperature for a long period of time.

BRIEF DESCRIPTION OF THE DRAWINGS

The accompanying figures, which are incorporated in and constitute a part of this specification, illustrate several embodiments described below.

DETAILED DESCRIPTION

The materials, compounds, compositions, articles, apparatuses, and methods described herein may be understood more readily by reference to the following detailed description of specific embodiments of the disclosed subject matter and the Examples included therein and to the Figures.

Before the present materials, compounds, compositions, articles, devices, and methods are disclosed and described, it is to be understood that the embodiments described below are not limited to specific synthetic methods or specific reagents, as such may, of course, vary. It is also to be understood that the terminology used herein is for the purpose of describing particular embodiments only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the layer" includes mixtures of two or more such layers, and the like.

"Optional" or "optionally" means that the subsequently described event or circumstance can or cannot occur, and that the description includes instances where the event or circumstance occurs and instances where it does not.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers or prepared by methods known to those skilled in the art.

Reference will now be made in detail to specific embodiments of the disclosed materials, compounds, compositions, articles, and methods, examples of which are illustrated in the accompanying Examples and Figures.

Described herein are synthetic sintered $YPO_4$ composite material comprising excess amount of yttria. The composite material comprises a plurality of grains and have a composition comprising $(Y_2O_3)m·(P_2O_5)n$, and a deficient amount of De(P) of $P_2O_5$ relative to $Y_2O_3$, where m and n are mole fractions of $Y_2O_3$ and $P_2O_5$ in the composite material, respectively, De(P)=((m−n)/n)×100%, and 0<De(P)≤0.5%. In certain embodiments of the sintered $YPO_4$ composite material, 0.10%≤De(P)≤0.5%; in certain embodiments 0.15%≤De(P) ≤0.5%. For the purpose of the present application, the deficient amount of $P_2O_5$ is equal to the excess amount of $Y_2O_3$ in the composite material. De(P) is sometimes called "$P_2O_5$ deficiency" or "deficiency in $P_2O_5$" in the present application.

Compared to stoichiometric $YPO_4$ material, which can be represented by the general formula $Y_2O_3 \times P_2O_5$, the sintered $YPO_4$ composite material has modified microstructural properties. Therefore, for the convenience of description, the sintered $YPO_4$ composite material of the present invention is sometimes referred to as "modified $YPO_4$ material" in the present application. The term "microstructural property" as defined herein is the properties or characteristics of the composite material at the microscopic level that influence the overall performance of an article composed of the modified $YPO_4$ material (e.g., mechanical properties). For example, by modifying one or more microstructural properties, it is possible using the methods described herein to produce articles with increased strength.

In general, the method involves: (I) mixing a $P_2O_5$-source material and a $Y_2O_3$-source material to produce an admixture; (II) heating the admixture to obtain a reacted material; (III) producing particles of the reacted material; (IV) forming the particles into a preform; and (V) sintering the preform to obtain an article comprising sintered $YPO_4$ composite material comprising a plurality of grains, having a composition comprising $(Y_2O_3)m·(P_2O_5)n$, and an excessive amount of De(P) of $P_2O_5$ relative to $Y_2O_3$, where m and n are mole fractions of $Y_2O_3$ and $P_2O_5$ in the composite material, respectively, De(P)=((m−n)/n)×100%, and 0<De(P)≤0.5%. In certain embodiments, in step (I), the amounts of $P_2O_5$-source material and the $Y_2O_3$-source material are selected such that an excess amount of $Y_2O_3$ is provided than needed for producing stoichiometric $YPO_4$. In certain other embodiments, in step (I), the amounts of $P_2O_5$-source material and the $Y_2O_3$-source material are selected such that an essentially stoichiometric $YPO_4$ is produced in step (II), and in step (IV), additional $Y_2O_3$-source material is included in the preform.

"Stoichiometric-xenotime" or "stoichiometric $YPO_4$" as referred to herein is $YPO_4$ material produced from stoichiometric amounts of $Y_2O_3$ and $P_2O_5$ as depicted in equation 1:

$$Y_2O_3 + P_2O_5 \rightarrow 2YPO_4 \qquad (1)$$

Thus, there is no excess of either $Y_2O_3$ or $P_2O_5$ present in stoichiometric-$YPO_4$ material. The amount of $Y_2O_3$ present in modified $YPO_4$ material will be discussed below with respect to modified microstructural properties.

The first step involves admixing a $P_2O_5$-source and an $Y_2O_3$-source to produce a mixture. The amount of $P_2O_5$-source and an $Y_2O_3$-source is sufficient so that after the heating step excess yttrium oxide remains. The $P_2O_5$-source and $Y_2O_3$-source can be admixed using techniques known in the art. For example, the $P_2O_5$-source and $Y_2O_3$-source can be turbula mixed as dry powders. Alternatively the $P_2O_5$-source and/or $Y_2O_3$-source can be in a solution and admixed with one another.

In the present application, the terms "phosphorous oxide source" and "$P_2O_5$-source" are used interchangeably. The "$P_2O_5$-source" is any material that can provide the phosphorous in the reaction to form $YPO_4$. For example, in one embodiment, elemental phosphorous can be used as a $P_2O_5$-source in the production of $YPO_4$ or modified $YPO_4$ materials. For another example, $HPO_3$, $H_3PO_4$, at various concentrations, may be used as $P_2O_5$-source for making $YPO_4$ and modified $YPO_4$ materials. For another example, the $P_2O_5$-source can be a salt that can be readily converted to $P_2O_5$ in air at elevated temperatures. Alternatively, the $P_2O_5$-source is $P_2O_5$. Similarly, in the present application, the terms "yttrium oxide source" and "$Y_2O_3$-source" are used interchangeably in the present application. An "$Y_2O_3$-source" is any material that can provide yttrium in the reactions to form $YPO_4$. For example, the $Y_2O_3$-source can be $Y_2O_3$ per se. Alternatively, the $Y_2O_3$-source can be a salt (e.g., nitrate, halide, etc.) that can be readily converted to $Y_2O_3$ in air at elevated temperatures. In one embodiment, the $P_2O_5$ source and the $Y_2O_3$ source are mixed in dry form.

In another embodiment, the $P_2O_5$-source comprises phosphoric acid and the $Y_2O_3$-source comprises a molar excess of $Y_2O_3$-source (e.g., $Y_2O_3$). Heating the mixture to an elevated temperature results in the reactions between the source materials and the production of modified $YPO_4$ material as defined herein.

Additional methods for producing modified $YPO_4$ material are described below. In one embodiment, $Y_2O_3$-source (such as $Y_2O_3$ per se or a yttrium salt as mentioned above) can be admixed with stoichiometric $YPO_4$ material prepared beforehand. In this embodiment, the $Y_2O_3$-source material is distributed in the stoichiometric $YPO_4$ to obtain a modified $YPO_4$ of the present invention. In another embodiment, yttrium oxide can be precipitated on stoichiometric-$YPO_4$ in a liquid-containing dispersion (suspension, e.g.) by converting an yttrium salt (e.g., yttrium hydroxide or oxalate) to the oxide in situ.

After the $P_2O_5$-source and $Y_2O_3$-source have been admixed, the mixture is heated for a sufficient time and at a sufficient temperature to produce modified $YPO_4$ material. The heating time and temperature can vary depending upon the amount of $Y_2O_3$-source relative to the amount of $P_2O_5$-source used, the particle size and distribution of the staring materials, and the desired microstructural and mechanical properties of the modified $YPO_4$ material. For example, the microstructural and mechanical properties of the modified $YPO_4$ material can be monitored over different times and temperatures to optimize the desired properties (see Examples). In one embodiment, the mixture is first heated at a temperature from 1,000° C. to 1,475° C., 1,100° C. to 1,475° C., or from 1,200° C. to 1,475° C. After the initial heating step, the mixture is sintered at a temperature from 1,600° C. to 1,775° C. from 24 hours to 1,000 hours. In certain embodiments, it is desirable that the heating step be performed in a closed vessel or compartment such that the $P_2O_5$-source and/or $Y_2O_3$-source cannot escape, which can alter the final composition of the modified $YPO_4$ material.

After the heating step, the resulting material comprises excess $Y_2O_3$ as well as $YPO_4$ as the reaction product. The modified $YPO_4$ material comprises an excess amount of less than 0.5% $Y_2O_3$. In other embodiments, the modified $YPO_4$ material comprises an excess amount of $Y_2O_3$ (De(P)) of 0.01% to less than 0.5%, 0.05% to less than 0.5%, 0.1% to less than 0.5%, 0.15% to less than 0.5%, 0.15% to 0.45%, 0.15% to 0.40%, or 0.20% to 0.40%.

The excess $Y_2O_3$ present in the final modified $YPO_4$ material functions to modify one or more microstructural properties of the final product. The term "modify" as used herein includes changing the value of the microstructural property of the modified $YPO_4$ material relative to stoichiometric-$YPO_4$ comprising no excess of $Y_2O_3$. Thus, an increase or decrease in the value of the microstructural property is contemplated. As discussed above, mechanical properties such as, for example, creep rate, can be influenced by the microstructural properties of the material. Examples of microstructural properties that can be modified using the methods described herein include, but are not limited to, porosity, linear shrinkage, grain size, and grain shape. Each microstructural property is discussed below with respect to altering a mechanical property of the modified $YPO_4$ material.

In general, lower porosity levels tend to correlate with increased sintering shrinkage. Additionally, the extent of shrinkage also depends upon the initial particle size distribution of the $P_2O_5$-source and $Y_2O_3$-source, forming conditions, and processing conditions like sintering time and temperature. It is desirable that the linear shrinkage and porosity of the modified $YPO_4$ material are both low. Unacceptable cracking and distortion may occur when ceramic articles undergo more than 10% linear shrinkage during sintering. These problems are especially acute for large articles (e.g., an isopipe). By varying the sintering time and temperature as provided above with excess amounts of $Y_2O_3$, modified $YPO_4$ material having a porosity of less than 10%, less than 9%, or less than 8% can be achieved. In another embodiment, the porosity is from 7 to 9%. In other embodiments, the modified $YPO_4$ material has a linear shrinkage less than 10% after sintering at a temperature greater than 1,600° C. after at least 24 hours.

Another microstructural property that can be modified using the methods described herein includes grain size and grain shape. Creep rate of polycrystalline ceramic materials are generally inversely proportionate to the grain size. Although, ceramic bodies with larger grain sizes are most resistant to creep, they will be weaker at the service temperature as compared to a finer grained material. Excessively large grain sizes can also produce microcracking if the grain size exceeds a threshold value.

Not wishing to be bound by theory, it is believed that the presence of excess $Y_2O_3$ in the modified $YPO_4$ material assists in pore elimination during the sintering process by slowing grain growth. The $Y_2O_3$ phase reduces the mobility of grain boundaries, which prevents the formation of larger grains during sintering. Slower rate of grain growth provides more time for removal of pores during sintering. The excess $Y_2O_3$ can also control grain size so that porosity is minimized yet creep rate is not adversely affected due to the formation of small grains. In one embodiment, the modified $YPO_4$ material comprises one or more grains, wherein the size of the grains is less than 300 µm in certain embodiments, less than 100 µm in certain other embodiments, or less than 40 µm in certain other embodiments. In another embodiment, the modified $YPO_4$ material has a creep rate of less than 200 ppb/hr at 1,180° C. or less than 600 ppb/hr at 1,250° C.

By controlling the grain size, the modified $YPO_4$ material can have good mechanical strength. In general, the presence of large grain sizes can reduce mechanical strength. In one embodiment, the modified $YPO_4$ material has a Weibull stress of at least 60 MPa, in certain embodiments from 100 MPa to 140 MPa, in certain embodiments from 110 MPa to 140 MPa, in certain other embodiments from 120 MPa to 140 MPa at 1,200° C.

The excess $Y_2O_3$ present in the modified $YPO_4$ material can also act as a scavenger to sequester common impurities like silica and alumina. Not wishing to be bound by theory, it is believed that the impurities are drawn away from sensitive grain boundaries by the $Y_2O_3$, which can reduce creep but not compromise the strength of the modified $YPO_4$ material.

The modified $YPO_4$ materials produced herein can be used in an apparatus for producing a glass or a glass-ceramic material. In general, the modified $YPO_4$ material can be used to form an entire piece of apparatus used in a glass or glass-ceramic manufacturing system or just part of the piece of apparatus. For example, the apparatus, e.g., an isopipe, can have a core and a coating where the coating contacts molten glass and covers all or part of the core, in which case the modified $YPO_4$ material can form all or part of the core and/or all or part of the coating. In cases where the modified $YPO_4$ material is used as a coating, the core can be a second refractory material. Examples of suitable materials for such a core include, without limitation, alumina, magnesium oxide, a spinel, titanium oxide, yttrium oxide, or a combination thereof. Other refractory materials that can be used for the core include zircon, silicon carbide, and zirconia. The coating can be applied by standard methods for applying ceramic coatings, such as, flame spraying or plasma spraying.

In cases where the modified $YPO_4$ material is used as the core, the coating can comprise a second refractory material such as a refractory metal, a spinel, zircon, alumina, or a combination thereof. Examples of suitable refractory metals include platinum, molybdenum, rhodium, rhenium, iridium, osmium, tantalum, tungsten, and alloys thereof.

Isopipes used in the production of LCD glass sheets are very expensive to manufacture and maintain. In certain embodiments, when the modified $YPO_4$ material is used to produce the isopipe, a reduction in porosity can extend the lifetime of the isopipe. For example, if the isopipe is made of a material with a high porosity, particularly open pores, molten glass can infiltrate the open pores. This can lead to radical changes in the isopipe's properties over time. Therefore, in certain embodiments, the sintered $YPO_4$ composite material of the present invention has a geometric porosity of less than or equal to 10%, in certain embodiments less than or equal to 8%, in certain other embodiments less than or equal to 7%, in certain embodiments less than or equal to 5%. In certain embodiments, it is desired that at least 90% (such as 93%, 95%, 97%, 98%, 99%) of the pores are closed.

In addition to their use in isopipes, the modified $YPO_4$ material can also be used to form all or part of the following components of glass or glass-ceramic manufacturing equipment which, in typical applications, come into contact with molten glass or molten glass-ceramic: pipes, vessels, channels, weirs, bells, stirrers, bricks, blocks, gates, walls, bowls, ladles, needles, sleeves, plugs, molds, rings, plungers, tweels, and the like.

EXAMPLES

The following examples are set forth below to illustrate the methods and results according to the disclosed subject matter. These examples are not intended to be inclusive of all embodiments of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in °C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

I. Experimental Procedures

Batch Compositions

Powders of yttrium oxide and anhydrous phosphorous oxide were turbula mixed for 60 minutes, reacted in a crucible at 190° C. for 24 hours, and reacted a second time at 1,200° C. again for 24 hours. The influence of stoichiometry on sintering behavior, grain growth, and creep was studied for seven sintered $YPO_4$ composite materials (samples 1-7). Batch and compositional information is listed in TABLE 1. Platinum crucibles were used for all reactions with the exception; the sample 7 was reacted in a silica crucible. As a reference, the sample 8 is compositionally equivalent to sample 3.

Powder Synthesis and Processing

Reacted materials were dry ground and sieved to −325 mesh. After sieving, half of each batch was air-classified to −15 μm. Particle size of the −325 mesh sample 8 material was measured by light scattering as the technique is better suited to measure broad size distributions. A Coulter particle counter was used for the sample 2 powders. Particle size distributions (PSD's) of sample 8 after sieving to 325 mesh and both −325 mesh/+15 μm and −15 μm fraction of sample 2 after air-classification was determined.

Synthesized powders that were sieved to −325 mesh were analyzed by powder x-ray diffraction (XRD) to monitor reaction to form $YPO_4$ and the effect of stoichiometry on phase assemblage.

Microstructure

Pills for study of impact of firing time and temperature on porosity and grain size were formed by a combination of uniaxial and cold isostatic pressing (CIP). $YPO_4$ powders sieved to −325 mesh and air-classified to −15 μm powders were uniaxially pressed in a cylindrical die to a pressure of 3,000 psi. The pills were then vacuum-sealed in gloves and CIP'd to 18,000 psi. The pills of each composition and PSD were fired at 1,600° C. for times of 48, 240, and 1,000 hours and 1,750° C. for times of 100 hours. Porosity results are shown in TABLE 2. Dimensions of the samples were monitored at each step of the process to gauge shrinkage and porosity. Microstructures of the fired pills were revealed by first polishing and then thermally etching at 1,500° C. for 2 hours. Etched samples were examined and photographed under an optical microscope. Average grain sizes were obtained by manual analysis of the images. Grain size was determined by the linear intersection method (TABLE 3). Electron microprobe analysis (EPMA) was used to examine the morphology, distribution, and chemical composition.

Creep Testing

Billets used to produce machine creep specimens were formed by cold isostatic pressing (CIP) of −325 mesh powders to a pressure of 18,000 psi in a cylindrical rubber mold (Trexler Rubber) that measures ~50 mm in diameter and 180 mm in length. Two billets were pressed for each composition, one for firing at 1,750° C. for 4 hours and the other at 1,600° C. for 48 hours. Heating and cooling rates of 100° C./hour were used in each case. Dimensions of the billets were tracked from mold filling, pressing, and firing to monitor shrinkage and changes in geometric density/porosity. Standard size creep samples that measure ~3×5×155 mm were cut from the billets by wire-sawing. No creep tests were performed on materials fired to 1,600° C. due to excessive porosity. Two creep bars for each composition that were fired at 1,750° C. were refired again at 1,750° C. for an additional 96 hours using the same heating and cooling rates. Thus, creep tests were conducted on sintered $YPO_4$ composite materials subjected to cumulative firing times of 4 and 100 hours at 1,750° C.

Legacy creep bars of sample 8 that were cut from a CIP'd billet measuring ~80 mm in diameter and fired at 1,750° C. for 8 hours were included in the test matrix for the sake of comparison. Two creep bars of sample 8 were refired to 1,750° C. for 96 hours, as well.

Rate of flexural creep was measured in a three-point bend configuration. The testing rig provides a support span of 150 mm. Creep rate was measured at 1,180 and then 1,250° C. for each sample under an applied stress of 1,000 psi. Creep rates were determined by analysis of curves of deflection of the sample at mid span with time. The values in TABLE 4 correspond to secondary or steady-state creep.

Strength

Modulus of rupture (MOR) was measured by the four-point technique to understand the changes in strength of the standard sintered $YPO_4$ composite material with temperature and to determine how changes in phosphorous oxide deficiency affect high temperature strength. Bend-bars used in the four-point test were simply modified creep samples. The modifications were to cut the samples in half to a length of ~77 mm and to chamfer the tensile edges. The creep samples were cut in half to fit within the testing fixture and to provide a larger number of measurements and thereby increase statistical confidence. Cross-section of samples measured approximately 3×5 mm. A support span of 50.8 mm and load span of 19.05 mm were used in all tests. The strain rate was 17.8 μm/s, and the total duration of each test was typically between 20 and 40 seconds.

II. Characterization of Modified $YPO_4$ Material

Sintering and Microstructure

Reaction of yttria and phosphorous oxide at 1,200° C. to form $YPO_4$ and the presence of excess yttria are apparent in powder XRD traces. Sample 1 has diffraction peaks almost exclusively assignable to $YPO_4$. Additional peaks appear between 2θ of 27 and 34° for batches that contain excess yttria. Intensity of the peaks grows with increasing levels of excess yttria for the batches listed in TABLE 1 with one exception, sample 4.

Linear shrinkage and geometric porosity were characterized for all $YPO_4$ billets and pills. Low levels of porosity (<10%) tend to correlate with larger sintering shrinkages (>10%). The converse is also true. The optimum situation occurs when linear shrinkage and porosity are both low. Unacceptable cracking and distortion occur when ceramic articles undergo more the 10% linear shrinkage during sintering. These problems are especially acute for large articles like an isopipe. Porosity of a sintered isopipe should not be too high. Mechanical strength and creep are degraded by porosity. Additionally, glass can infiltrate open pores. Infiltration of glass by capillary forces into the bulk of an isopipe can lead to radical changes in its properties over time. Porosity should be maintained below 10% and preferably below 8% to ensure that pores are closed.

Powders that were air-classified to −15 μm sinter to low porosity, but show unacceptably large shrinkage. The −325 mesh powder fills space and packs more efficiently after cold isostatic pressing than the −15 μm powder. The formed green body has a higher density and has a lower capacity for shrinkage during sintering as indicated on FIG. 3. Although not shown here, the −325 mesh powder has a higher tap density and more effectively fills molds so there is less shrinkage during the cold isostatic pressing. Larger molds can be required for powders with low tap densities like the −15 μm air-classified powders in order to create a body of the desired final size. Also, the mold must stretch to accommodate the shrinkage of the powders part during pressing. The stretched mold exerts a force on the formed part that can lead to distortion in shape or cause cracks in the green body if compaction is excessive.

Figure 1:
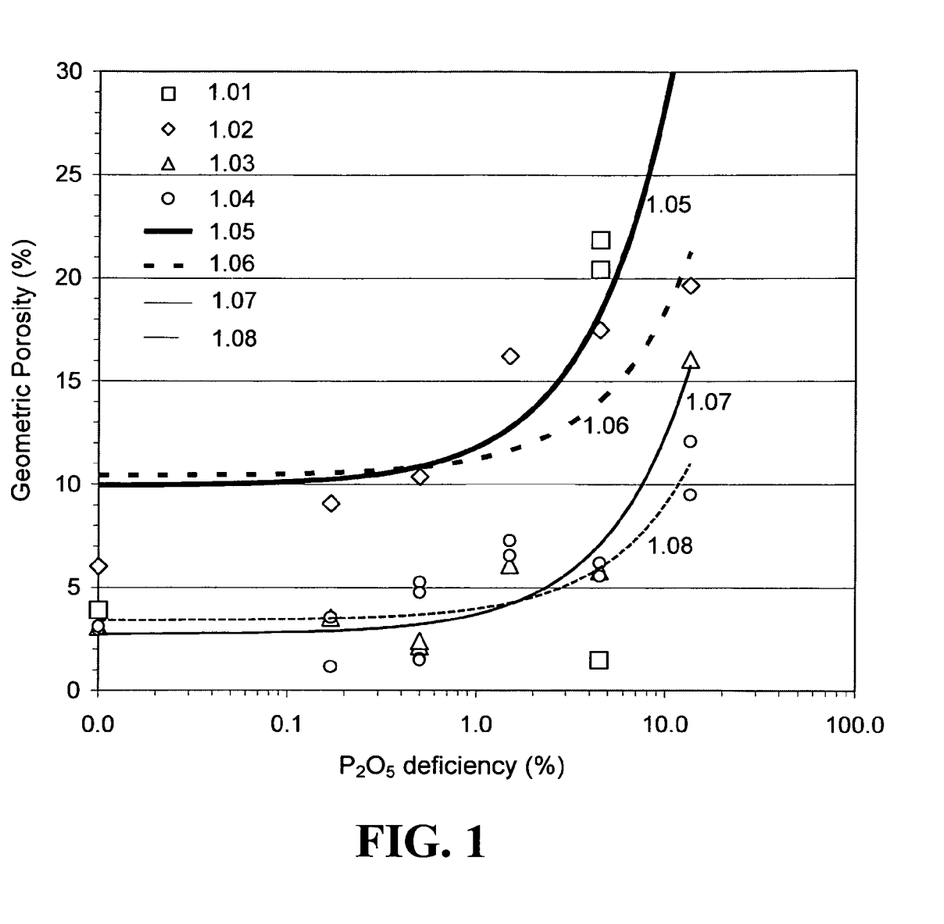
FIG. 1 shows a plot of geometric porosity of a series of synthetic sintered $YPO_4$ material samples as a function of $P_2O_5$ deficiency.

FIG. 1 shows the impact of excess yttria on the porosity of a series of sintered $YPO_4$ composite material samples. The reference numerals in this figure represent the following:

101: samples made from −15 μm powder sintered at 1600° C. for 48 hours;
102: samples made from −15 μm powder sintered at 1600° C. for 240 hours;
103: samples made from −15 μm powder sintered at 1600° C. for 1000 hours;
104: samples made from 325 mesh powder sintered at 1750° C. for 1000 hours;
105: linear fit of data of 101 to show trend;
106: linear fit of data of 102 to show trend;
107: linear fit of data of 103 to show trend;
168: linear fit of data of 104 to show trend.

Figure 2:
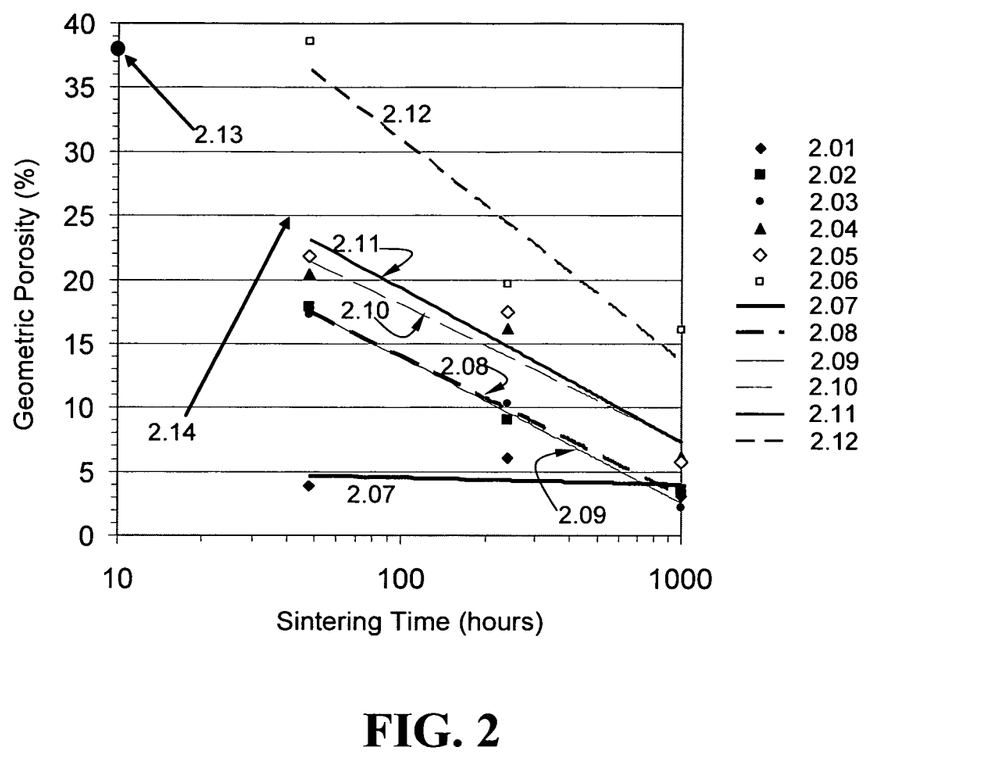
FIG. 2 shows a plot of geometric porosity as a function of sintering time for a series of synthetic sintered $YPO_4$ material samples.

Porosity is higher when excess yttria is present for otherwise identical sintering temperatures and times. For example, porosity increases gradually with yttria excess for pills prepared from −15 μm air-classified powders that were sintered at 1,600° C. for 240 hours as indicated by the squares in the figure. Porosity of samples made of −15 μm powder is plotted as a function of time in FIG. 2. The plot shows that excess yttria slows the rate of sintering but does not necessarily impose a lower limit on porosity that is different than a stoichiometric batch. The reference numerals in this figure represent the following:

201: Sample No. 1 sintered at 1600° C.;
202: Sample No. 2 sintered at 1600° C.;
203: Sample No. 3 sintered at 1600° C.;
204: Sample No. 4 sintered at 1600° C.;
205: Sample No. 5 sintered at 1600° C.;
206: Sample No. 6 sintered at 1600° C.;
207: Logarithmic fit of data of 201 to show trend;
208: Logarithmic fit of data of 202 to show trend;
209: Logarithmic fit of data of 203 to show trend;
210: Logarithmic fit of data of 204 to show trend;
211: Logarithmic fit of data of 205 to show trend;
212: Logarithmic fit of data of 206 to show trend;
213: Post CIP porosity for −15 μm powders;
214: Trend of increasing $P_2O_5$ deficiency.

Figure 3:
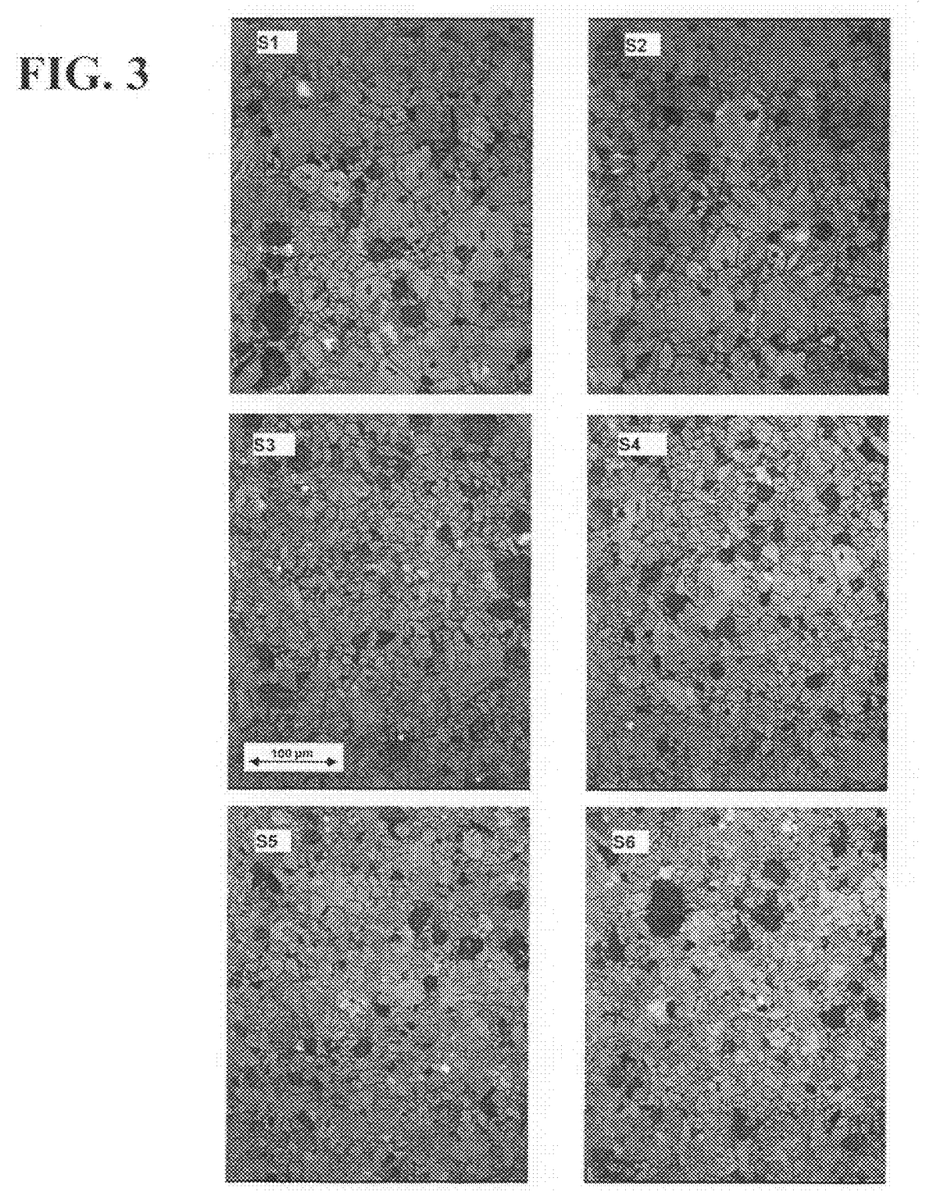
FIG. 3 shows optical photomicrographs of a series of polished and thermally etched synthetic sintered $YPO_4$ material samples that were sintered at 1,750° C. for 96 hours.
Figure 4:
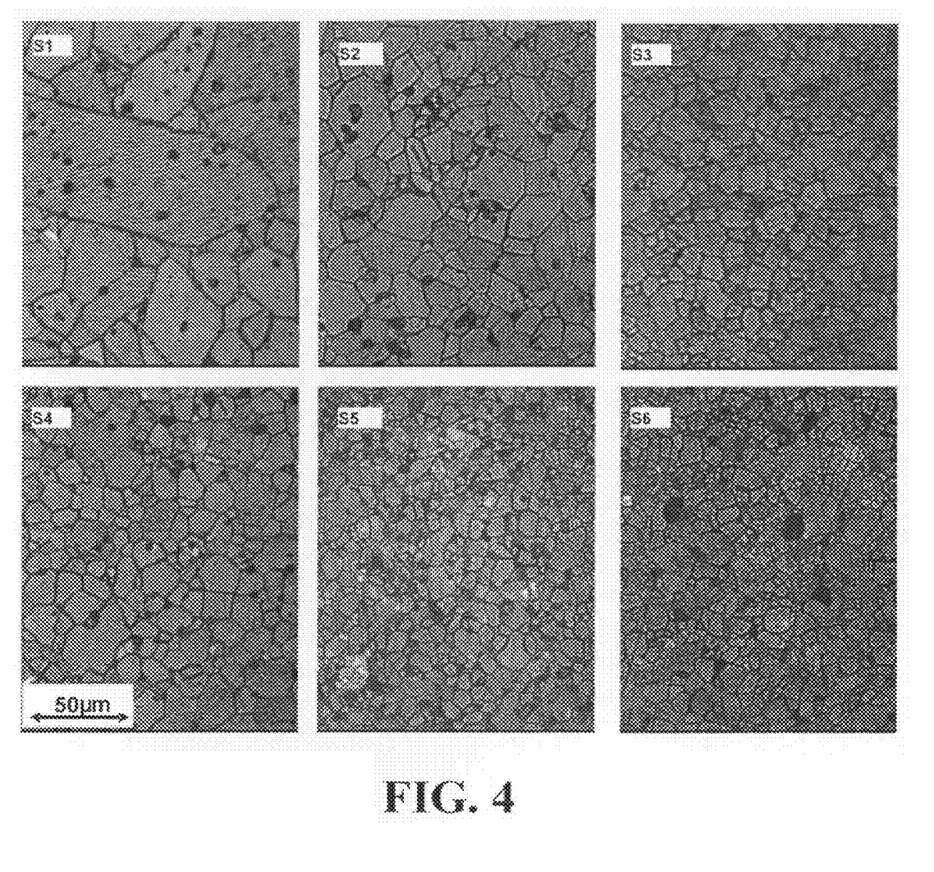
FIG. 4 shows optical photomicrographs of a series of polished and thermally etched synthetic sintered $YPO_4$ material samples that were sintered at 1,600° C. for 1,000 hours.

Addition of excess yttria to a batch to produce $YPO_4$ material has a strong impact on grain structure. Uncontrolled (idiomorphic) grain growth has been observed in stoichiometric $YPO_4$ powders. Similar behavior was observed in the stoichiometric sample 1 composition. Grain size varies dramatically from one region to another. Addition of excess yttria to the batch has been confirmed to slow grain growth and limit grain size thereby producing sintered $YPO_4$ materials with more homogeneous microstructures. Panels of microstructure for $YPO_4$ composite material samples across the full range of yttria excess examined in this study and sintered at 1,750° C. for 96 hours and 1600° C. for 1,000 hours are shown in FIGS. 3 and 4, respectively ("S" represents "Sample No." in FIGS. 3 and 4). The size of grains decreases progressively as levels of excess yttria in the batch are increased. An attempt was made to quantify the effect by measuring grain sizes. TABLE 3 provides a summary of average grain size measured by the linear intercept technique. Average grain size is plotted as a function of sintering time in FIG. 5 and as a function of yttria excess in FIGS. 6 and 7 for sintering temperatures of 1,750 and 1,600° C., respectively.

Figure 5:
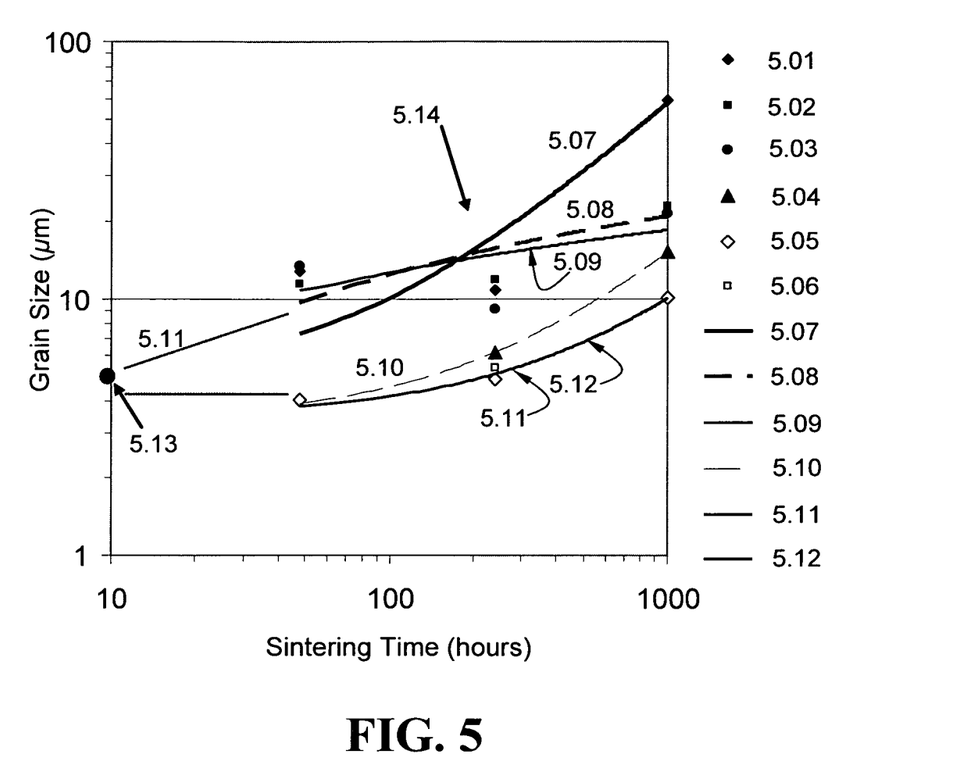
FIG. 5 shows a plot of grain size as a function of sintering time for a series of synthetic sintered $YPO_4$ material samples.

In FIG. 5, the reference numerals represent the following:
501: Sample No. 1 sintered at 1600° C.;
502: Sample No. 2 sintered at 1600° C.;
503: Sample No. 3 sintered at 1600° C.;
504: Sample No. 4 sintered at 1600° C.;
505: Sample No. 5 sintered at 1600° C.;
506: Sample No. 6 sintered at 1600° C.;
507: linear fit of data of 501 to show trend;
508: logarithmic fit of data of 502 to show trend;
509: logarithmic fit of data of 503 to show trend;
510: linear fit of data of 504 to show trend;
511: linear fit of data of 505 to show trend;
512: linear fit of data of 506 to show trend (overlaps with 511);
513: Initial powder $d_{50}$;
514: increasing trend of $P_2O_5$ deficiency.

Figure 6:
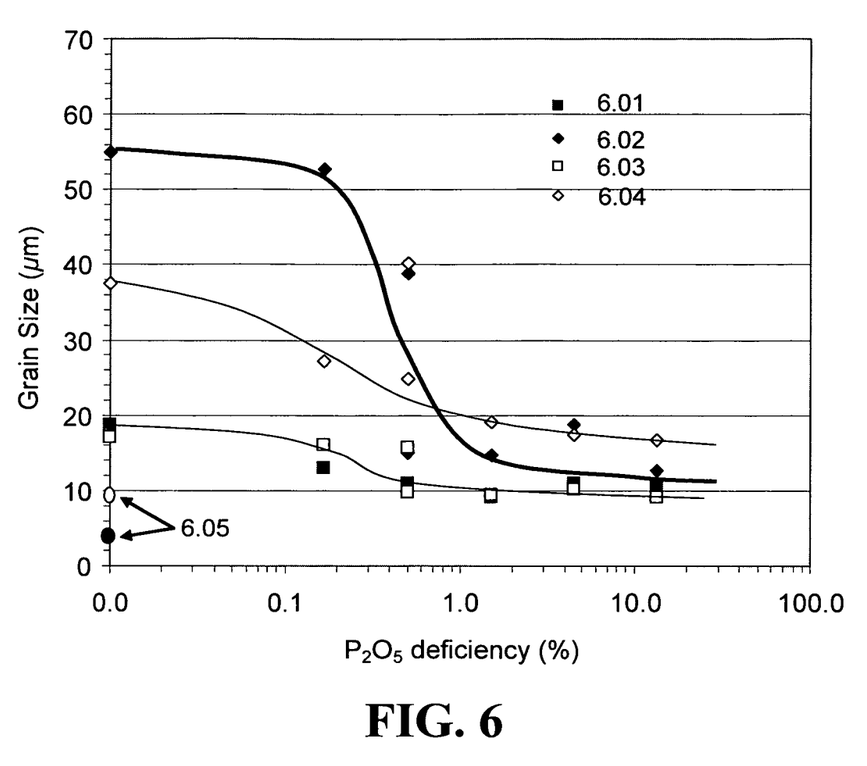
FIG. 6 shows a plot of grain size as a function of $P_2O_5$ deficiency for several samples sintered at 1,750° C. at 4 hours and 96 hours, respectively.

In FIG. 6, the reference numerals represent the following:
601: Samples made from −15 μm powders sintered for 4 hours;
602: Samples made from −15 μm powders sintered for 96 hours;
603: Samples made from −325 mesh powders sintered for 4 hours;
604: Samples made from −325 mesh powders sintered for 96 hours;
605: Initial powder $d_{50}$.

Figure 7:
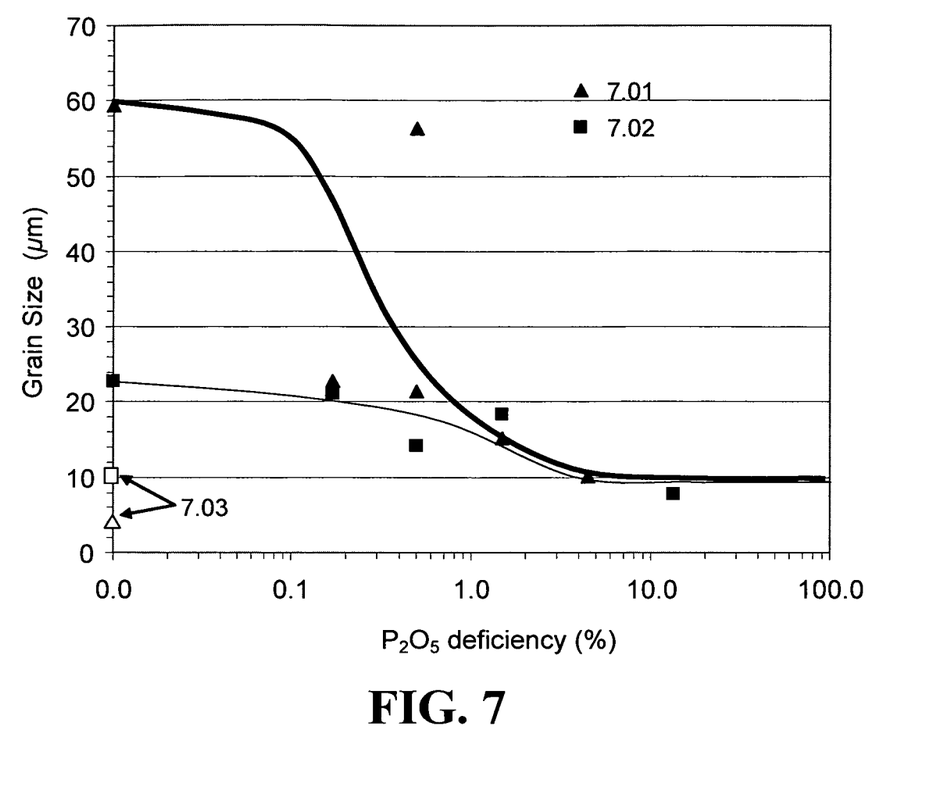
FIG. 7 shows a plot of grain size as a function of $P_2O_5$ deficiency for a series of synthetic sintered $YPO_4$ material samples sintered at 1,600° C. at 48, 240, and 1,000 hours, respectively.

In FIG. 7, the reference numerals represent the following:
701: Samples made from −15 μm powders sintered for 1000 hours;
702: Samples made from −325 mesh powders sintered for 1000 hours;
703: Initial powder $d_{50}$.

Figure 8:
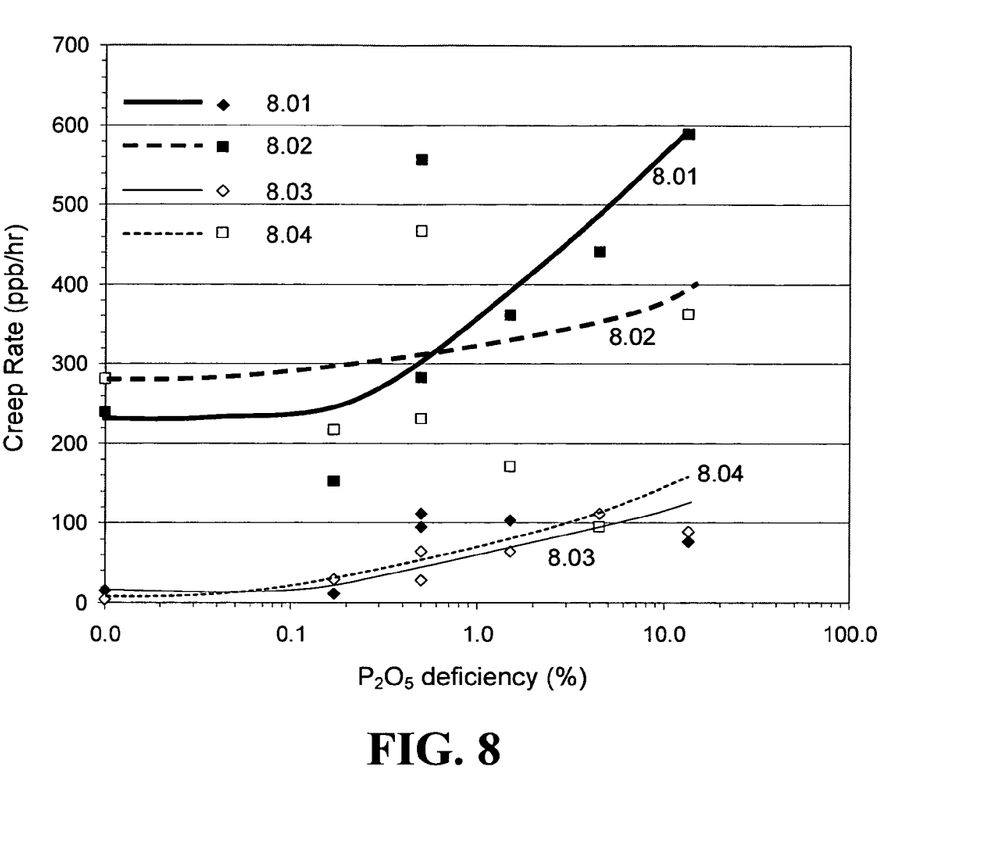
FIG. 8 shows creep rates at 1,180° C. and 1,250° C. as a function of $P_2O_5$ deficiency for a series of synthetic sintered $YPO_4$ material samples sintered at 1,750° C. for 4 and 100 hours, respectively.

In FIG. 8, the reference numerals represent the following:
801: Samples sintered for 4 hours and tested at 1180° C.;
802: Samples sintered for 4 hours and tested at 1250° C.;
803: samples sintered for 100 hours and tested at 1180° C.;
804: samples sintered for 100 hours and tested at 1250° C.

Initial average particle size for the −325 mesh and −15 μm powders are indicated in the plots as reference points from which to judge the extent of grain growth. No change in average grain size occurs relative to the original particle size when approximately 1.0-1.5% excess yttria is added to the batch. The experiments demonstrate that grain size of sintered $YPO_4$ composite materials can be controlled by selection of initial PSD and addition of the appropriate amount of excess yttria to the batch.

Creep and Modulus of Rupture

Rates of flexural creep measured at 1,180 and 1,250° C. under a 1,000 psi load for sintered $YPO_4$ composite materials with a range of stoichiometries are tabulated in TABLE 4 and plotted in FIG. 8. Also included in the table are geometric porosities of the creep specimens. Geometric porosity (P(g)) is calculated as follows:

$$P(g) = \left(1 - \frac{\rho_m}{\rho_t}\right) \times 100\%,$$

where $\rho_m$ is measured density of the actual material, and $\rho_t$ is the theoretical density of the densified material. It is assumed that the theoretical density of all specimens regardless of the specific compositions is 4.22 g·cm$^{-3}$.

Generally, creep of polycrystalline ceramics like sintered YPO$_4$ composite materials increase with decreasing grain size and increasing porosity. An attempt was made to fit creep data to establish a mechanism through the creep-exponent and to account for impact of porosity. Although there are some trends in the creep results, there is also significant scatter. Nevertheless, the plots show that the creep rates at 1,180° C. increase with increasing excess yttria and increase with decreasing sintering time. Grain size drops with increasing amounts of excess yttria within the sintered YPO$_4$ composite materials, and grain sizes are smaller for short sintering times. The creep behavior of the sintered YPO$_4$ composite material is at least qualitatively consistent with theoretical predictions for creep in polycrystalline ceramics. Another possible interpretation of this trend is that the creep rate is affected not by grain size, but by the quantity of second phase. Preparation of sintered YPO$_4$ composite materials with a range of grain sizes but at a constant level of second phase and porosity would be necessary to make the distinctions. A similar trend is not apparent for data collected at 1,250° C.

MOR tests were performed on sintered YPO$_4$ composite materials, which were sintered at 1750° C. for 4 hours with levels of excess yttria listed in TABLE 1. The MOR tests were conducted at 1200° C. as this is near the service temperature for an isopipe. Weibull parameters and stresses derived from the measured data are given in TABLE 5. The Weibull stress which is an indicator of the strength of the material ranges from 120 to 140 MPa across the studied range of excess yttria. The Weibull stress increases slightly moving from the stoichiometric composition to the slight excess of yttria in sample 2. The Weibull stress increases further for sample 3. It then begins to fall at higher concentrations of excess yttria. The strengthening effect encountered by the addition of a slight excess of yttria can be related to reduction of grain size (see TABLE 3 and FIG. 6). Further increases in excess yttria do not markedly reduce grain size but begin to interfere with densification. This can be seen by inspection of porosity listed in TABLE 4. Within this study, grain sizes only vary by a factor of two from the stoichiometric composition (sample 1) to the material with the greatest quantity of excess yttria (sample 6).

Edge Effects

Weibull stresses and parameters derived from analysis of stress at rupture are given in TABLE 5. The difference in Weibull stresses for samples originating from near an edge and those from bulk was less than 5 percent. The Weibull moduli, however, differed significantly from one another and from the random sample set. The Weibull moduli from the edge, bulk and random locations were 11, 15.8, and 22.6. Weibull moduli from edge and bulk location are both lower than from the random sample set. This indicates that the selected edge and bulk samples may have been handled roughly before testing.

Throughout this application, various publications are referenced. The disclosures of these publications in their entireties are hereby incorporated by reference into this application in order to more fully describe the compounds, compositions and methods described herein.

Various modifications and variations can be made to the materials, methods, and articles described herein. Other embodiments of the materials, methods, and articles described herein will be apparent from consideration of the specification and practice of the materials, methods, and articles disclosed herein. It is intended that the specification and examples be considered as exemplary.

TABLE 1

| Sample No. | P$_2$O$_5$ Deficiency | Crucible | Y2 (g) | P4 (g) |
|---|---|---|---|---|
| 1 | 0 | Pt | 1842.255 | 1169.625 |
| 2 | 0.17 | Pt | 1842.255 | 1167.63 |
| 3 | 0.5 | Pt | 1842.255 | 1163.775 |
| 4 | 1.5 | Pt | 1842.255 | 1152.075 |
| 5 | 4.5 | Pt | 1842.255 | 1116.99 |
| 6 | 13.5 | Pt | 1842.255 | 1011.72 |
| 7 | 0.5 | SiO2 | 1842.255 | 1163.775 |

Batch formulations:
Y$_2$O$_3$ + P$_2$O$_5$ → 2YPO$_4$
3 kg batch with ideal stoichiometry requires: 1842.0705 g Y$_2$O$_3$ and 1157.928 g P$_2$O$_5$.
Batch materials designation and its gram equivalency:
Y2 = Y$_2$O$_3$, 99.99%
P4 = P$_2$O$_5$, 99.0%
Calcined at 190° C. for 24 hours.
Reacted at 120° C. for 24 hours.

TABLE 2

| | Porosity (%) | | | | | | | | | |
|---|---|---|---|---|---|---|---|---|---|---|
| | Sintering temperature 1600° C. | | | | | | Sintering temperature 1750° C. | | | |
| | −15 um | | | −325 mesh | | | −15 um | | −325 mesh | |
| Sample | 48 | 240 | 1000 | 48 | 240 | 1000 | 4 | 96 | 4 | 96 |
| 1 | 4 | 6 | 3 | 21 | 18 | 10 | 1 | 3 | 3 | 3 |
| 2 | 18 | 9 | 4 | 23 | 16 | 9 | 1 | 2 | 2 | 3 |
| 3 | 17 | 10 | 2 | 23 | 19 | 13 | 1 | 5 | 2 | 2 |
| 4 | 20 | 16 | 6 | 26 | ND | ND | 4 | 3 | 7 | 5 |
| 5 | 22 | 18 | 6 | 23 | 20 | 15 | 0 | 4 | 6 | 1 |
| 6 | 39 | 20 | 16 | 24 | 22 | 17 | 9 | 8 | 11 | 2 |
| 7 | 1 | 1 | 2 | 24 | 21 | 13 | 2 | 4 | 5 | 5 |

TABLE 3

| | Average grain size (μm) | | | | | | | | | |
|---|---|---|---|---|---|---|---|---|---|---|
| | Sintering temperature 1600° C. | | | | | | Sintering temperature 1750° C. | | | |
| | −15 μm | | | −325 mesh | | | −15 μm | | −325 mesh | |
| Sample | 48 | 240 | 1000 | 48 | 240 | 1000 | 4 | 96 | 4 | 96 |
| 1 | 13 | 11 | 59 | 9 | 12 | 23 | 19 | 55 | 17 | 38 |
| 2 | 11 | 12 | 23 | 8 | 10 | 21 | 13 | 53 | 16 | 27 |
| 3 | 13 | 9 | 21 | 8 | 10 | ND | ND | 15 | 10 | 25 |
| 4 | ND | 6 | 15 | ND | ND | 18 | 9 | 15 | 9 | 19 |
| 5 | 4 | 5 | 10 | 8 | 8 | ND | 11 | 19 | 10 | 17 |
| 6 | ND | 5 | ND | 8 | ND | 8 | 11 | 13 | 9 | 17 |
| 7 | 19 | ND | 56 | 9 | 12 | 14 | 11 | 39 | 16 | 40 |

TABLE 4

| Sample No. | Deficiency in $P_2O_5$ | Intrinsic Creep Rate (ppb/hr) | | | | | |
|---|---|---|---|---|---|---|---|
| | | 1750° C./4 hr | | | 1750° C./100 hr | | |
| | | Porosity (%) | 1180° C. | 1250° C. | Porosity (%) | 1180° C. | 1250° C. |
| 1 | 0 | 3 | 16 | 239 | 3.1 | 4 | 281 |
| 2 | 0.2 | 2.4 | 11 | 152 | 3.4 | 29 | 217 |
| 3 | 0.5 | 1.5 | 94 | 282 | 1.6 | 64 | 230 |
| 4 | 1.5 | 6.9 | 104 | 361 | 5 | 64 | 171 |
| 5 | 4.5 | 5.9 | 112 | 441 | 1.1 | 111 | 95 |
| 6 | 13.5 | 10.8 | 77 | 588 | 2 | 90 | 361 |
| 7 | 0.5 | 5 | 112 | 556 | 5.2 | 28 | 467 |
| 8 | 0.5 | 2.3 | 38 | 460 | 2.3 | 196 | 375 |

TABLE 5

| Sample No. | Temperature (° C.) | Weibull Parameters | | |
|---|---|---|---|---|
| | | Stress (MPa) | Modulus | n |
| 8 | 25 | 96.9 | 14.3 | 37 |
| 8 | 400 | 109 | 15 | 30 |
| 8 | 800 | 128.4 | 20.3 | 34 |
| 8 | 1200 | 95.2 | 22.6 | 31 |
| 8-Edge | 1200 | 95.6 | 11 | 10 |
| 8-Center | 1200 | 91.6 | 15.8 | 10 |
| 1 | 1200 | 131.4 | 25.5 | 12 |
| 2 | 1200 | 138 | 11.1 | 12 |
| 3 | 1200 | 140.9 | 9.5 | 8 |
| 4 | 1200 | 121.5 | 11.1 | 10 |
| 5 | 1200 | 125.5 | 10.4 | 10 |
| 6 | 1200 | 113.4 | 6.5 | 10 |
| 7 | 1200 | 125.1 | 16.3 | 9 |

What is claimed is:

1. A sintered $YPO_4$ composite material comprising a plurality of grains, having a composition comprising $(Y_2O_3)m \cdot (P_2O_5)n$, where m and n are mole fractions of $Y_2O_3$ and $P_2O_5$ in the composite material, respectively, and $0 < De(P) = ((m-n)/n) \times 100\% \leq 0.5\%$.

2. A composite material according to claim 1, wherein $De(P) \geq 0.10\%$.

3. A composite material according to claim 1, wherein the sintered $YPO_4$ composite material has a geometric porosity of less than 10%.

4. A composite material according to claim 3, wherein at least 90% of the pores in the sintered $YPO_4$ materials are closed.

5. A composite material according to claim 1, wherein the sintered $YPO_4$ composite material has an average grain size of less than 300 μm.

6. A composite material according to claim 5, wherein the sintered $YPO_4$ composite material has an average grain size of at least 10 μm.

7. A composite material according to claim 1, wherein the sintered $YPO_4$ composite material has a creep rate of less than 200 ppb/hr at 1180° C.

8. A composite material according to claim 1, wherein the sintered composite material has a creep rate of less than 600 ppb/hr at 1250° C.

9. A composite material according to claim 1, wherein the sintered composite material has a Weibull stress of at least 60 MPa at 1200° C.

10. An article operable at a temperature at higher than 1000° C., comprising the composite material according to claim 1.

11. An article according to claim 10, which is an isopipe.

12. A glass melting apparatus comprising the article according to claim 10.

* * * * *